United States Patent [19]
Dodge, Jr.

[11] Patent Number: 5,336,570
[45] Date of Patent: Aug. 9, 1994

[54] HYDROGEN POWERED ELECTRICITY GENERATING PLANAR MEMBER

[76] Inventor: Cleveland E. Dodge, Jr., P.O. Box 178, Hoosick Falls, N.Y. 12090

[21] Appl. No.: 15,411

[22] Filed: Feb. 9, 1993

Related U.S. Application Data

[63] Continuation-in-part of Ser. No. 929,706, Aug. 12, 1992, abandoned.

[51] Int. Cl.$^5$ ............................................. H01M 8/10
[52] U.S. Cl. ..................................... 429/31; 429/33; 429/35
[58] Field of Search ................ 429/32, 30, 33, 31, 429/34, 35, 94, 39

[56] References Cited

U.S. PATENT DOCUMENTS

| | | |
|---|---|---|
| 4,175,165 | 11/1979 | Adlhart . |
| 4,824,742 | 4/1989 | Parry ................................ 429/30 |
| 5,094,928 | 3/1992 | Dyer . |
| 5,171,646 | 12/1992 | Rohr ................................ 429/32 X |

Primary Examiner—Anthony Skapars
Attorney, Agent, or Firm—Handal & Morofsky

[57] ABSTRACT

Disclosed is a hydrogen fuel cell which resists swelling of a proton-exchange membrane electrolyte by clamping the membrane between two catalytic electrodes in a tubular or frusto-conical configuration. Improved breathability and hydrogen sealing are obtained. The electrodes can be bonded to the solid electrolyte by employing an electrolytic proton-transporting polymer in the liquid-phase. Including finely divided platinum in the liquid phase provides an advantageous means of incorporating catalyst in the cell. Also disclosed is a blind tube porous carbon electrode assembly which can be manufactured by a method including coating a self-supporting electrode with a liquid-phase polymeric electrolyte material, for example, perfuorosulfonic acid, and curing it.

38 Claims, 9 Drawing Sheets

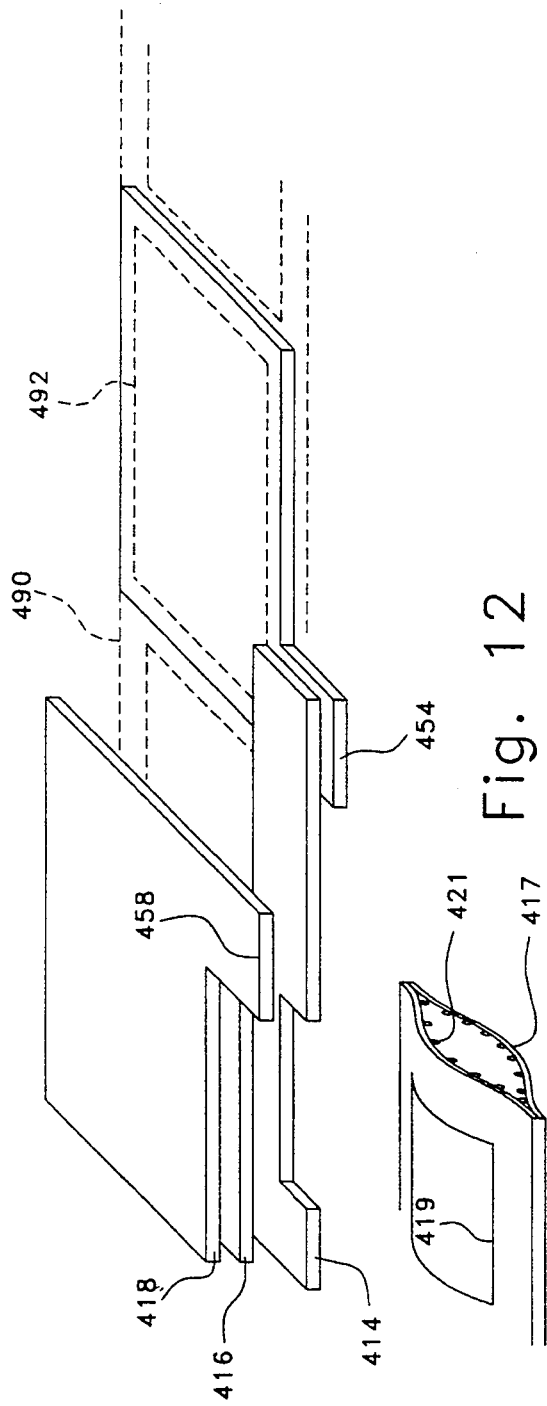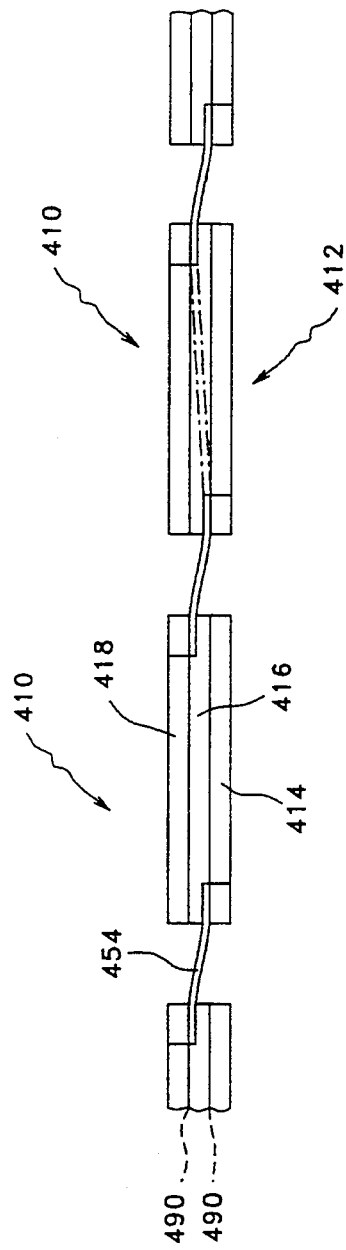

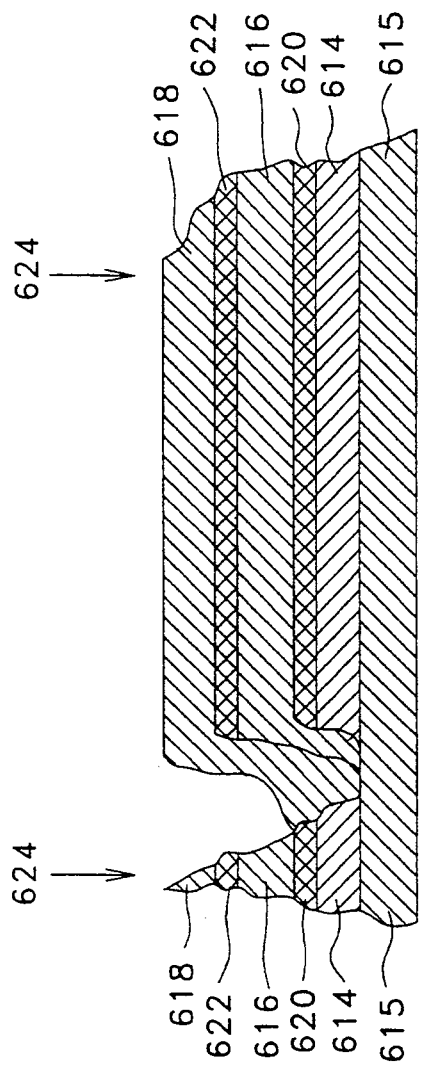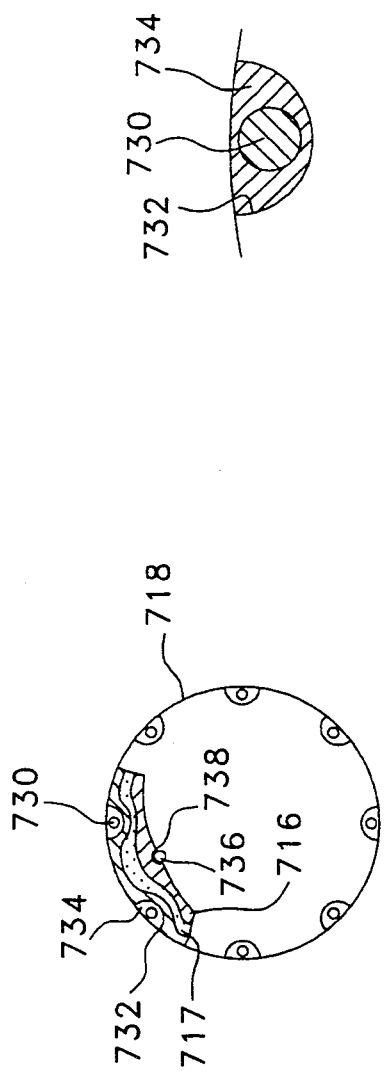

HYDROGEN POWERED ELECTRICITY GENERATING PLANAR MEMBER

CROSS-REFERENCE TO RELATED APPLICATION

This application is a continuation-in-part of my co-pending application Ser. No. 07/929,706 filed Aug. 12, 1992, now abandoned.

TECHNICAL FIELD

The present invention relates to a compact configuration for hydrogen power cells of the type which receive hydrogen fuel and produce electricity.

BACKGROUND

Ever since the political vulnerability of this nation's largely foreign controlled petroleum sources became painfully obvious in the early 1970's, there has been an intensive effort devoted to the development of alternative energy sources and conservation of existing resources. In more recent years, the acute nature of the energy problem has been underscored by a growing public awareness of the related environmental questions.

To a large extent, efforts aimed at energy conservation and alternative energy generation have met with a large degree of success in such areas as the heating and cooling of structures, automobile efficiency and the like. More particularly, large advances have been made by designing hotter running gasoline engines, use of reflective glazing, impermeable construction barriers, solar heating and the like.

However, one technology which has largely failed to live up to its very promising expectations is the use of hydrogen for the generation of electricity. Generally, this technology involves the utilization of hydrogen in electrochemical reaction for the purpose of generating electricity. A device in which such a process is carried out is generally referred to as a fuel cell. Because the electricity is generated by the reaction of hydrogen with oxygen, the only reaction emission involved is water vapor which is harmless to the environment. This may be compared to gasoline combustion which involves the release of hydrocarbons, carbon monoxide, and complex chemical species into the environment (along with the primary emissions, carbon dioxide and water vapor).

While it has been known that fuel cells offer many advantages as compared to other power sources, particularly in supplying power at remote locations (such as outer space or the like) and offer at least, in principle, limited service and maintenance requirements, various problems are presented by existing fuel cell technology. Nevertheless, perhaps the most advantageous fuel cell systems presently available (for certain applications, at least) are those which utilize a so-called proton-exchange membrane (PEM) electrolyte. Generally, in systems such as this, the electrolyte is embodied in the form of a synthetic polymeric material which acts as an electrolyte while still having the characteristic of being a solid body.

This type of system offers numerous advantages. For example, since the electrolyte phase is solid, no operational complications arise from migration of electrolytic material into adjacent regions of the fuel cell. At the same time, the system is mechanically stable and hardy under a wide variety of operating conditions. Moreover, such fuel cells have the ability to operate at or near room temperature and thus provide virtually instantaneous start-up. In principle, such systems offer the possibility that thermal management may be passively achieved, although practical implementation of this in a wide variety of designs may pose difficult design problems. One such fuel cell is described in Adlhart U.S. Pat. No. 4,175,165 which discloses a stack of grooved bipolar cell plates bolted together and secured with tension straps, a heavy and bulky construction designed to prevent fuel leakage.

SUMMARY OF THE INVENTION

The invention, as claimed, is intended to provide a remedy. It solves the problem of providing a hydrogen fuel cell utilizing a solid Pro-Exchange Membrane electrolyte. The inventive hydrogen fuel cell comprises a first anode comprising a porous electrically conductive member and having a first end and a second end. The second end of the first anode is positioned opposite the first end of the first anode. A first electrolytic member is disposed over and in facing contacting relationship to at least a portion of the first anode. The first electrolytic member has a first end proximate the first end of the first anode and a second end proximate the second end of the first anode. A first cathode has first and second ends, and comprises a porous electrically conductive member. The first cathode is disposed over and in facing contacting relationship to the first electrolytic member. At least a portion of the first cathode member is in facing relationship to a portion of the first anode member. The first end of the first cathode is facing the first end of the first anode and the second end of the first cathode is facing the second end of the first anode. A second anode comprises a porous electrically conductive member having a first end and a second end. The second end of the second anode is positioned opposite the first end of the second anode. The second anode is positioned in spaced relationship to the first anode with the second end of the first anode proximate and spaced from the first end of the second anode. A second electrolytic member is disposed over and in facing contacting relationship to the second anode. The second electrolytic member has a first end proximate the first end of the second anode and a second end proximate the second end of the second anode. A second cathode has first and second ends. The second cathode is made of an electrically conductive air permeable material. The second cathode is disposed over and in facing contacting relationship to the second electrolytic member. The first end of the second cathode is proximate the first end of the second electrolytic member and the second end of the second cathode is proximate the second end of the second electrolytic member. An electrically conductive bridge extends from the second end of the first anode to the first end of the second cathode.

A further aspect of the invention provides a hydrogen fuel cell having a layered electrode structure said fuel cell comprising:

a) a layered porous anodic electrode;
b) ducting to supply hydrogen to said porous anodic electrode;
c) a layered porous cathodic electrode exposable to oxygen;
d) a layered electrolytic member between and in contact with said anode and with said cathode for transporting ions therebetween;

e) catalytic means at said anodic and said cathodic electrodes for ionizing hydrogen and oxygen respectively;

f) a support for said electrolytic structure, said support engaging one of said electrodes; and g) restraining means engaging said electrodes to constrain said electrolytic member between and in contact with said electrodes;

wherein said restraining means acts to displace transverse swelling of said electrolytic member in directions generally parallel to said layered electrodes.

In another aspect the invention provides a fuel cell having an electrolytic structure, comprising:

a) a porous anodic electrode;

b) ducting to supply hydrogen to said porous anodic electrode;

c) a porous cathodic electrode exposable to oxygen;

d) a selectively permeable thin-layer electrolytic member between and in contact with said anode and with said cathode for transporting hydrogen ions therebetween; and e) an electrolytic sealant between at least one of said electrodes and said electrolytic member;

wherein said sealant bonds said at least one electrode to said electrolytic member with occlusion of voids over a substantial area to provide good electrolytic contact therebetween, said sealant being a polymeric material deposited in situ from a liquid phase.

In a still further aspect the invention provides a hydrogen fuel cell comprising a self-supporting shaped, layered electrode structure in which a solid-phase proton-transporting electrolyte is sandwiched between a porous anode and a porous cathode, said structure being shaped to provide an enclosed chamber having a mouth through which hydrogen can be admitted to said chamber, said fuel cell further comprising a base closing said mouth and carrying a hydrogen supply and electrical connections to said electrode structure.

The invention also provides a method of manufacturing a hydrogen fuel cell comprising a self-supporting shaped, layered electrode structure in which a solid-phase proton-transporting electrolyte is sandwiched between a porous anodic electrode and a porous cathodic electrode, comprising the steps of a) coating a first, shaped self-supporting electrode with a curable, liquid-phase, proton-transporting electrolytic material to provide an electrolytic coating;

b) curing said electrolytic coating to the solid phase;

c) assembling said coated electrode with a second, mating, shaped electrode to provide said layered structure;

d) and assembling said electrode structure with a support base.

BRIEF DESCRIPTION OF THE DRAWINGS

One way of carrying out the invention is described in detail below with reference to drawings which illustrate only specific embodiments of the invention and in which:

FIG. 11 is a side view of the embodiment of FIG. 10;

FIG. 12 is an exploded perspective view of the embodiment of FIG. 10;

FIG. 15 is a partial sectional view similar to FIG. 4 of another embodiment of a layered fuel cell employing an adhesive between the layers;

FIG. 17 is a schematic sectional view of a modified embodiment of the fuel cell of FIG. 16 employing a view on the line 17—17 of FIG. 16; and FIG. 18 is an enlargement of a detail of FIG. 17.

BEST MODE FOR CARRYING OUT THE INVENTION

Figure 1:
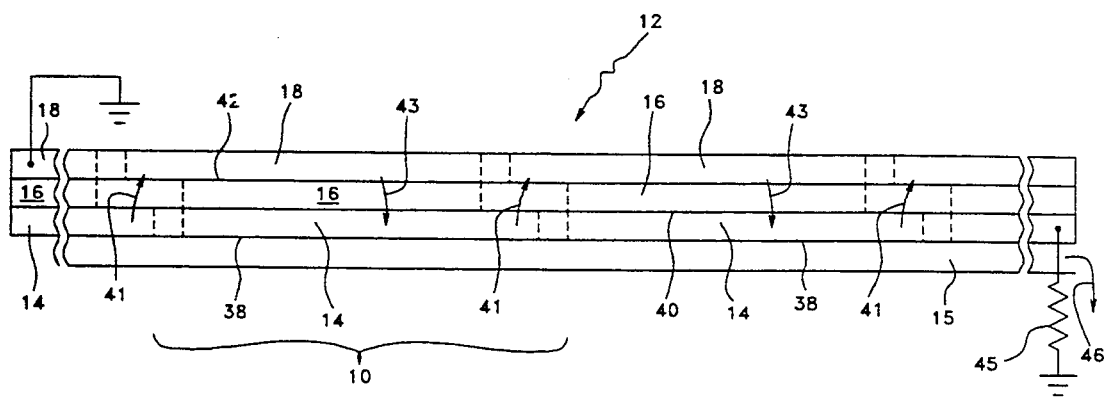
FIG. 1 is a schematic representation of a fuel cell, constructed in accordance with the present invention.
Figure 2:
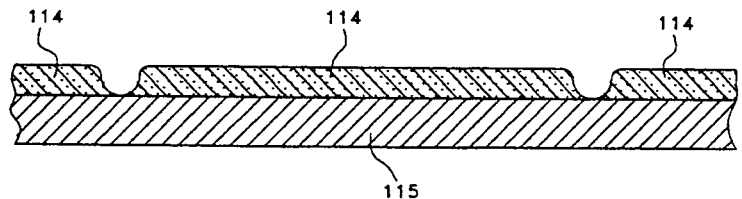
FIG. 2–4 illustrate successive steps in the fabrication of a power cell in accordance with the invention.
Figure 3:
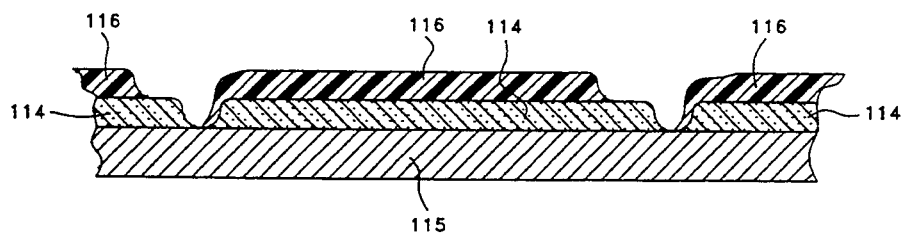

Referring to FIG. 1, a hydrogen powered electricity generating cell 10 incorporating the present invention, as appears more fully below, is illustrated. Cell 10 includes a plurality of layers of planar members each having relatively small thickness and an active area of approximately 75 square centimeters, being about 10 cm. long and 7.5 cm. wide. A single cell 10 has the capacity of generating approximately three watts at approximately 0.7 volts.

An actual power source 12, as illustrated in FIG. 1, comprises a plurality of cells 10 which are disposed in edgewise surface-to-surface contact with each other. This results in effectively putting the cells in series. In a preferred arrangement, seventeen cells thus connected will generate a voltage equal to the voltage of an individual cell multiplied by the number of cells in the power source 12, or about 12 volts.

Each cell 10 comprises an anode 14, which comprises a material, such as carbon fiber cloth or paper, that conducts electricity and is porous enough to pass hydrogen. Such carbon fiber paper is a paper-like product made of compacted graphite fibers which is available from numerous sources including the Toray Company of Tokyo, Japan. Suitable materials are Kreha 400 and Toray TGP. Anode 14 is supported on a substrate 15 which is made of screening, porous paper or any material capable of passing hydrogen gas. Anode 14 has a thickness of 0.01 to 0.05 cm. An electrolyte member 16 is disposed in contact with anode 14.

Electrolyte member 16 is made of a solid polymeric material, which is especially designed for use as an electrolyte, and may be of the type sold by the du Pont Company of Wilmington, Del. under the trademark NAFION. Electrolyte member 16 has a thickness of 0.001 to 0.020 cm. In order to function efficiently as an electrolyte, electrolyte member 16 must have a high water content.

The next layer in cell 10 is a cathode 18, another layer incorporating a so-called carbon paper sheet. Cathode 18 also has a thickness of 0.01 to 0.05 cm.

During operation of the inventive cell, hydrogen is supplied through gas permeable substrate 15 to anode 14. Naturally, depending upon materials used, the structure may be strong enough to function without having a substrate. Because anode 14 is made of compacted graphite fibers, it is largely gas permeable and the hydrogen is caused to migrate from the input face 38 of anode 14 to its output face 40. The fibers of anode 14, which are in the region adjacent to output face 40 have a quantity of platinum or other suitable catalyst deposited thereon. Such deposition may be achieved by co-depositing the platinum (as platinum-black particles or supported on conductive carbon particles) with a polymeric material such as Teflon plastic, such polymeric material serving as a binder for the platinum (or platinum-containing) particles and as a hydrophobic agent to prevent accumulation of water in the catalyst layer.

Because of the presence of the catalyst platinum, hydrogen molecules reaching the region of anode 14 adjacent face 40 and substantially in contact with the electrolytic layer 16 are decomposed into hydrogen atoms and have their electrons stripped, resulting in the formation of H+ ions. These ions are able to penetrate through the Nafion electrolytic layer of electrolyte member 16. Thus, a continuous flow of hydrogen to electrolyte member 16 is achieved.

In similar fashion, oxygen (which may be mixed with other gases and in the form of ambient air) is caused to flow through cathode 18. Cathode 18, because it is made of compacted carbon or graphite fibers is permeable to oxygen, resulting in oxygen advancing toward the opposite side of electrolyte member 16 adjacent cathode 18.

Here again, the face 42 of cathode 18 has its surface impregnated with a deposit of platinum or other suitable catalyst. The result is that the oxygen molecules are broken down into oxygen atoms in the presence of the catalyst and accept electrons from the external circuit while reacting with H+ ions reaching these sites from electrolyte member 16, thereby forming water.

During cell operation, electrons created by the dissociation of the hydrogen molecules and atoms due to the action of the catalyst at the output face 40 of the anode, are available and are sent via an external circuit to a load 45 as illustrated in FIG. 1. Electrons follow the circuit path in the direction indicated by arrow 46. These electrons, after they pass through load 45, become associated with the oxygen atoms created by the platinum at the output face 42 of the cathode 18. This, along with reaction with the H+ ions from electrolyte member 16, results in the formation of water molecules. This ongoing reaction continues to draw hydrogen ions created at the output face 40 of the anode 14 through electrolyte member 16 to the catalyst at cathode output face 42.

As can be seen in FIG. 1, all layers of cell 10 are electrically conductive, either electronically or ionically. This includes the anode, the electrolyte, and the cathode.

Thus, obtaining higher voltages from a cell is merely a matter of extending the length of the power source 12 with the configuration illustrated in FIG. 1 (series-connected). Generally the anode 18 of one cell 10 is connected to the cathode 14 of the next adjacent cell in the series, resulting in current flow in the direction indicated by arrows 41 between cells and arrows 43 through each cell 10.

A method of working an alternative embodiment of the invention is illustrated in FIGS. 2-5. Generally, similar parts or parts performing analogous, corresponding or identical functions to those of the FIG. 1 embodiment are numbered herein with numbers which differ from those of earlier described elements by multiples of one hundred.

In accordance with one embodiment of the invention, a web or substrate 115 is made of a highly air permeable material in the form of a long sheet member large enough to form the desired number of cells. An anode 114 is formed by depositing graphitic or other suitable material in liquid form on web 115, using a silk-screen or another suitable process. This forms the structure of FIG. 2. Such material may be a suspension of graphite fibers and carbon block in a plastic and solvent solution, which, when it evaporates, will leave a matrix of graphite fibers secured to each other by conductive plastic. The resulting structure will thus have the properties of electrical conductivity and air permeability.

After deposition of anodes 114 in automated sequential fashion, Nafion electrolytic plastic is next deposited to form an electrolytic member 116. Again deposition of the material is done in liquid form, using a silk-screen or other automated process, to form the structure of FIG. 3.

Figure 4:
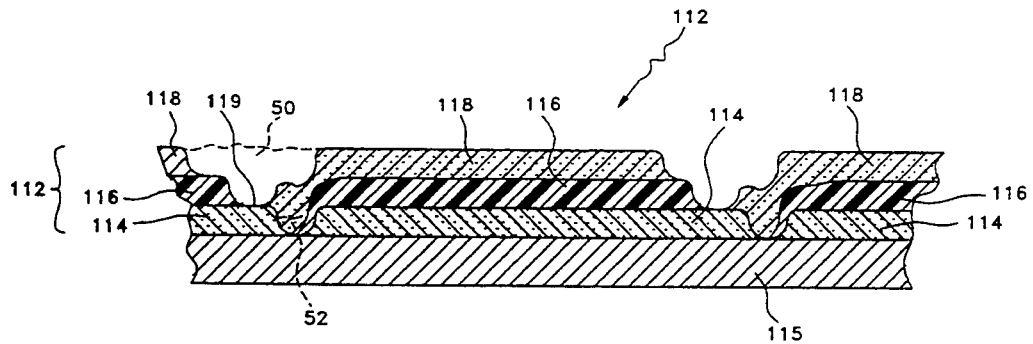

Referring to FIG. 4, the cells 110 are completed with the deposition of cathodes 118, using the same materials as were used to form anodes 116 and with a small overlap over the exposed edge 119 of anode 116 to make the connection between anode and cathode of adjacent cells in the series circuit.

Figure 5:
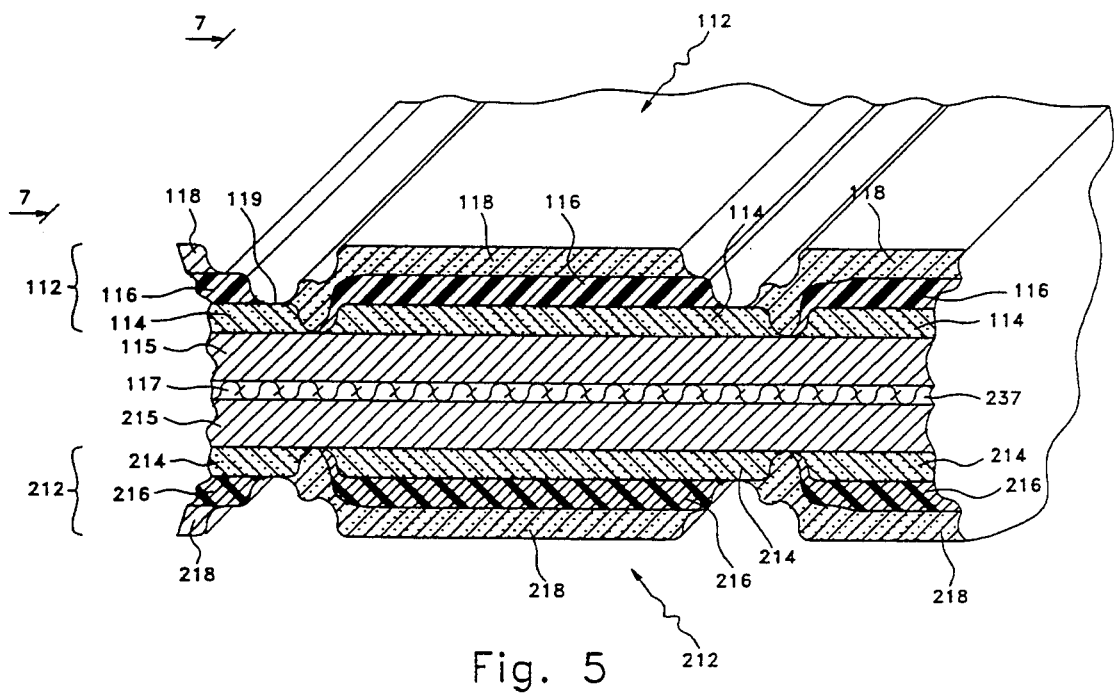
FIG. 5 shows an alternative embodiment of the invention.
Figure 7:
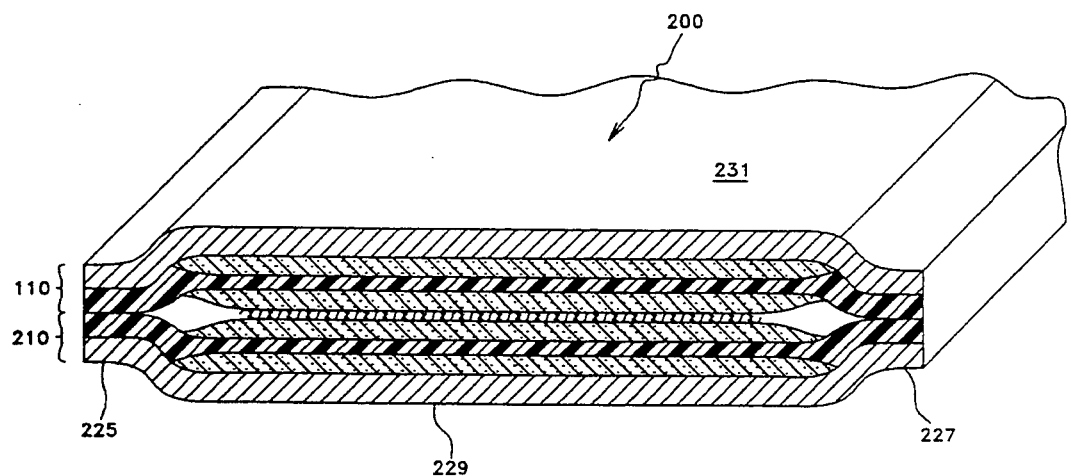
FIG. 7 is a view along lines 7–7 of FIG. 5 at a different scale for clarity of illustration.
Figure 6:
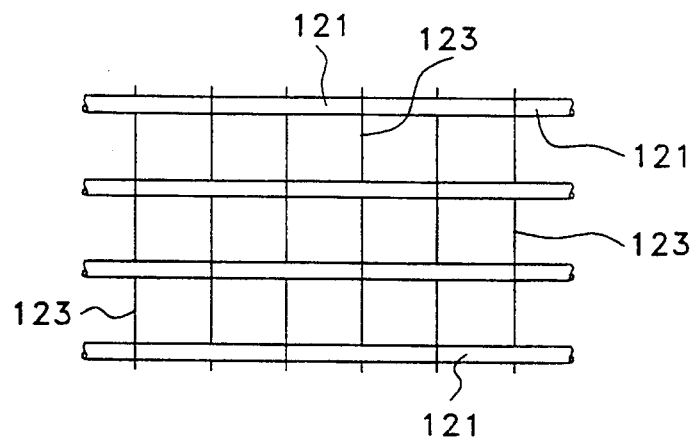
FIG. 6 illustrates a part of the embodiment of FIG. 5.

A particularly advantageous structure is illustrated in FIGS. 5-7. Here two batteries 112 and 212 are in facing relationship to each other to form a single power cell. Batteries 112 and 212 are separated by a screen 117 or other planar member which allows hydrogen to pass to facing substrate 115 and 215 to reach anodes 114 and 214. Screen 117 may be of conventional design, or, as illustrated in FIG. 6, may have thick members 121 and transverse thin members 123. Thick members 121 and oriented to extend in the direction of hydrogen flow through the system.

Figure 8:
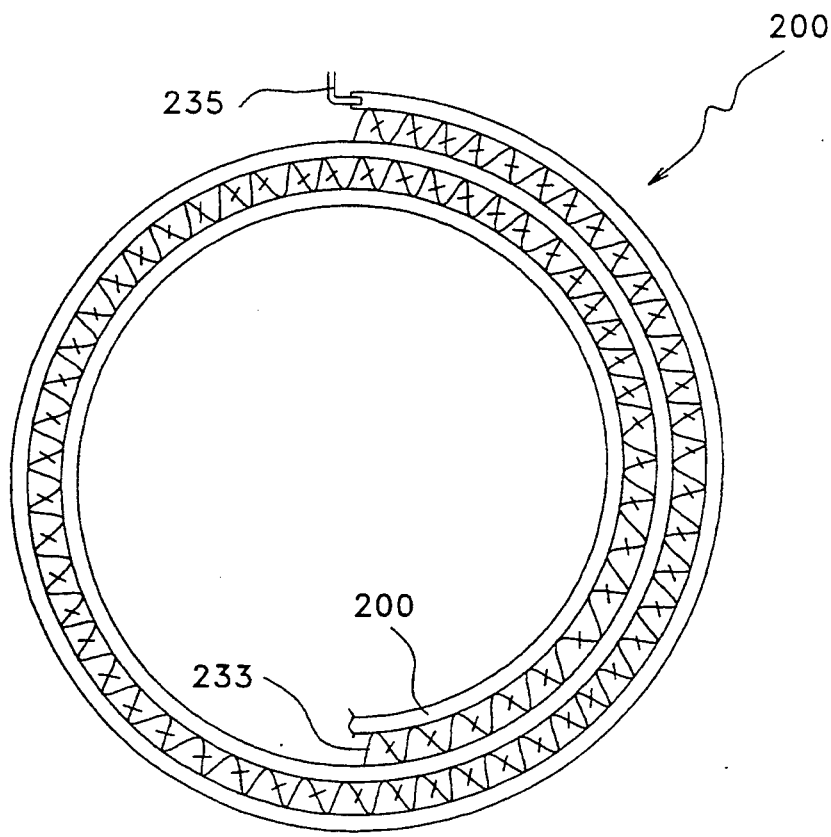
FIG. 8 illustrates a spiral configuration for the fuel cell of FIG. 5.

In accordance with a preferred embodiment of the invention two elongated batteries 112 and 212 are disposed one facing the other over their entire identical lengths, as illustrated in FIG. 5. To keep hydrogen in the system, the two cells 110 and 210 are sealed along their edges 225 and 227 as illustrated in FIG. 7, to form a power system 200. If desired, power system 200 may be rolled into a cylinder as illustrated in FIG. 8. Because oxygen must enter both exposed faces 229 and 231, a separator screen 233 must be wound with power system 200, as it is put in the form of a cylinder.

During operation, hydrogen gas is introduced into the system 200, via an inlet 235, as illustrated in FIG. 8. Referring to FIG. 5, hydrogen enters the space 237, through which it migrates through substrate 115 and 215 to each anodes 114 and 214, respectively. The hydrogen then passes through the electrodes to their respective electrolytic layers 116 and 216, which pass hydrogen ions to their respective cathodes 118 and 218, resulting in an accumulation of electrons at the anode and a shortage of electrons at the cathode. At the cathode interface with the electrolyte, the hydrogen ion meets the oxygen which passed through screen 233, forming water which passes out of the cathode to screen 233 where it is allowed to escape.

In a typical 50 watt fuel cell operating at 12 volts, at 0.7 volts per cell, seventeen cells are required. Given the typical 35 watts/sq. ft., 1.43 sq. ft. are required. At a three inch width, a four inch cell length is required. With a 0.25 inch gap between cells, total cell length is 4.25 inches. With the construction of FIG. 5, a three foot length is required. For a roll with an inner diameter of three inches, and an outer diameter of four inches the total assembly has a four inch outer diameter and a three inch width.

Figure 9:
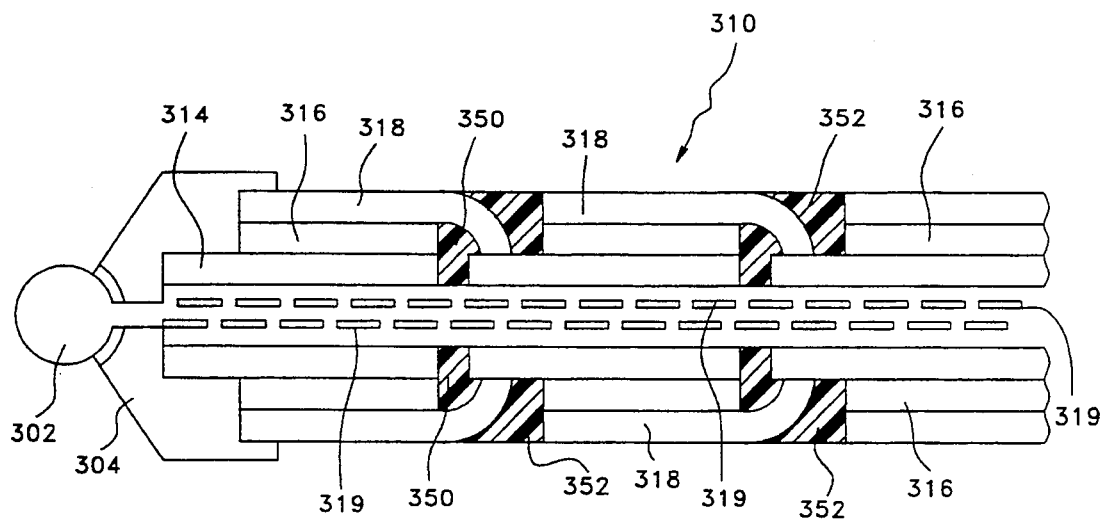
FIG. 9 is a schematic view of an alternative embodiment.

Referring to FIG. 9, an alternative embodiment of the system of the present invention is schematically illustrated. In this embodiment the cell 310 has improved gaseous fuel handling characteristics. The schematic illustration of cell 310 in FIG. 9 is a conceptual approach which can be applied to the structures illustrated in FIGS. 1–8 and in the other structures disclosed in this application.

Referring to FIG. 9, cell 310 comprises anodes 314 and electrolytic members 316. Individual electricity generating subsystems are completed by cathodes 318. Hydrogen supply to the system is provided by a source 302 which is coupled to the cell 310 by a manifold 304.

Manifold 304 couples into upper and lower cell assemblies 310a and 310b. Manifold 304 is also coupled to a perforated tube 317 which has numerous holes 319 disposed therein and through which hydrogen from source 302 is evenly distributed throughout the entire system.

In accordance with the embodiment of FIG. 9, air handling is yet further enhanced by a plurality of barrier members 350 and 352 which prevent the escape of hydrogen directly through the anodes and cathodes, respectively. In similar fashion, a barrier members 50 and 52 could be provided in the other embodiments, as illustrated in phantom lines in FIG. 4.

Figure 10:
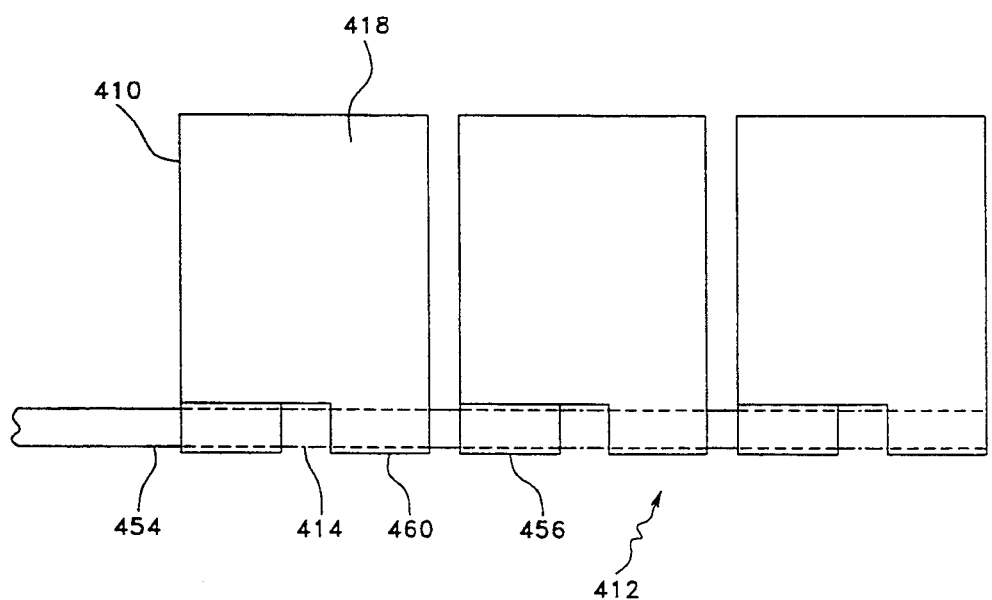
FIG. 10 is a schematic view of yet another alternative embodiment.

FIG. 10 schematically illustrates an alternative construction technique using sheets of graphite fiber paper to form the electrodes and in which system operation is enhanced through the use of increased effective ohmic contact area between individual electricity generating units in the cell. Here each individual unit cell 410 in the battery 412 includes an anode 414 and the cathode 418, separated by an electrolytic member 416 (FIG. 11). This particular arrangement has the advantage of relatively large low resistance contact areas, as compared to the relatively small contact areas between anode and cathode in, for example, the embodiment of FIG. 4. As illustrated in FIG. 11, connections between adjacent cells 410 in battery 412 is achieved using foil sheet connector conductors 454. Naturally, any suitable conductive member of suitable form, such as metal foil, metal wire, carbon fiber, graphite sheet, or the like may be employed as a connector conductor. Anodes 414 and cathodes 418 may be made of any suitable material, such as carbon fiber or graphite fiber cloth and electrolytic member 416 may be made of Nafion brand plastic electrolytic material (made by E. I. Dupont) or any other suitable product. As can be seen in FIG. 11, the connection interface between conductors 454 and anode and cathode extension tabs 456 and 458 represent substantially larger areas which, in principle, can be extended to be slightly less than half the length of the individual cells 410.

Referring to FIG. 12, the construction of battery 410 may be understood. In particular, it is noted that connectors 454, as illustrated in exploded perspective, are positioned between tabs 456 and 458. This is done during a stacking type assembly operation. In accordance with the preferred method of manufacturing the structure illustrated in FIG. 10, a continuous foil strip would be used during the stacking operation with portions 460 (illustrated in phantom lines in FIG. 10) being removed from the assembled structure in a die-cutting operation after assembly of the electrode, leaving behind the connectors 454 illustrated in solid lines in FIG. 10. A hydrogen feed is provided by a flat tube 417 which includes a plurality of holes 419 which are positioned to feed individual cells. Alternatively, many small holes may be substituted for large holes 419 and the interior of the tube provided with nubs 421 or other structures to prevent it from collapsing or becoming blocked.

It is also possible to obtain better sealing with and between electrode and electrolytic members by the use of plastic sheet gaskets 490 with windows 492 cut therein to allow the passage of gas. The same would be secured by heat sealing. It is also contemplated that a range of structures can be used to support an assembly in a spiral configuration, such as a film development type spiral support.

Figure 13:
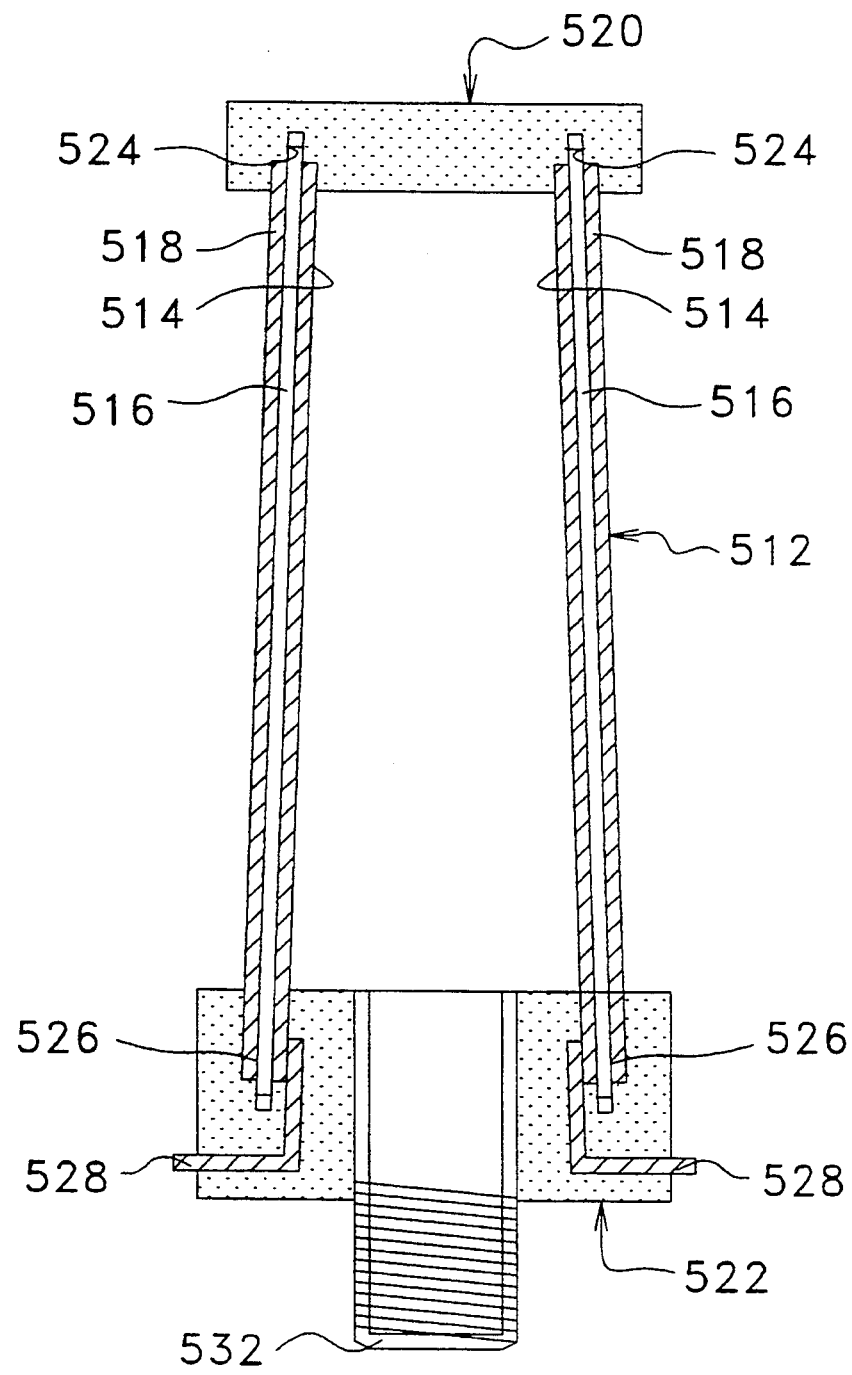
FIG. 13 is a vertical section through another, in this case tubular, fuel cell embodiment of the invention.

In the embodiment of FIG. 13, a fuel cell according to the invention, which is particularly suitable for operation with a source of hydrogen, is shown in an upright or vertical position and takes the general form of a closed tube the interior of which is supplied with a gaseous fuel, preferably hydrogen, while the exterior is flushed with, or exposed to oxygen or an oxygenated gas such as air. This structure is designed to resist swelling of the electrolytic member which, in other configurations, creates curvature of the electrolytic member exerting pressure on the anode and cathode which may rupture the cell disrupting contact with the electrolytic member and reducing cell efficiency.

The side wall of the tube is constituted by laminar cell elements, namely a hydrogen-porous anodic electrode, or anode, an electrolytic member and an oxygen-porous cathodic electrode, or cathode, reading sequentially from the inside outward. Inactive end caps close the tube and carry connectors for the electrodes. At least one of the end caps has a connection for supplying hydrogen, although it would not be impossible to admit hydrogen into the cell interior through the side wall, if desired.

Some surprising and useful advantages are obtained from a mildly tapered tubular shape giving the side wall a frusto-conical shape. In particular, this configuration provides efficient and secure clamping of electrolytic member 516 between the electrodes 514 and 518, in a manner which is rendered self-tightening by any swelling of the electrolytic member 516. Furthermore, this novel fuel cell structure allows the cell to breathe freely with good exposure of the outer electrode surfaces to hydrogen and oxygen respectively. The design facilitates the admission of hydrogen to the interior of the cell and thence to the surface of the anode, in a gas-tight, leak-free manner, and avoids any need for complex gaskets that are subject to leakage.

The fuel cell structure shown in FIG. 13 is further designed for efficient oxygen, or air, flow over the outer surface of the cathode for removal of water and heat therefrom. The just-described advantages of this embodiment of my fuel cell invention, and their accomplishment, will be further explained in the following description.

Referring to FIG. 13, in which, with the obvious exceptions, horizontal cross-sections perpendicular to the plane of the paper are circular, the tubular fuel cell shown comprises an electrically active tube member 512 formed by a frusto-conical inner anodic electrode or anode 514 and a frusto-conical outer cathodic electrode or cathode 518, between which is supported a similarly shaped electrolytic member 516, the three elements being disposed concentrically.

While the corresponding frusto-conical shapes of the electrodes 514, 518 and the electrolytic member 518 could conceivably taper at an angle of 20° to the vertical, a preferred inward taper is quite small, less than 10°, and more preferably from 1° to 7°. In the best known embodiment of the invention, the electrodes 514, 518 and the electrolytic member 516 are not only of circular section, but also, as will be apparent from the foregoing description, concentrically arranged in the fuel cell.

Clearly, a circular section, while aesthetic and efficient, is a preferred embodiment of an annular member, which could have a quite irregular cross-section, but preferably has a regular cross-sectional shape such as triangular, square or polygonal. In this embodiment of the invention, circular is a preferred cross-sectional shape. A circular shape avoids seams, elbows, or other surface discontinuities in the tube member 512 and, as will be described in more detail hereinbelow, facilitates compression or clamping of the electrolytic member 516 between the electrodes 514, 518. To this end, the circular shape is effective in evenly distributing pressure on the electrolytic member 516 and in urging the electrodes 514, 516 into good electrical contact therewith over a wide area.

As may be seen in FIG. 13, the electrolytic member 516 protrudes beyond the anode 514 and the cathode 518, at the top and the bottom thereof, to prevent shorting out, to eliminate edge effects and to maximize the electrolytically active area. As shown, each of the cell elements comprises a simple, continuous, integral member. A simple, frusto-conical tubular embodiment, as shown can also be constructed as a plurality of series-connected cell panels, extending circumferentially. However, more complex constructions providing a multicellular wall construction of the tube, such as is shown for the spiral or coiled embodiment of FIG. 8, are also possible. In this case, the individual cells, or panels, are connected in series around the side wall of the tube. Such a coiled construction requires separators or baffles to separate hydrogen from oxygen or air and to apply hydrogen only to one side of the resultant cell strip, the other side being exposed to air or other oxygen source. Preferably, where this construction produces a chamber for the oxygen-bearing gas, that chamber has an upwardly tapering section to assist in drawing heat and water vapor out of the cell, in a flue-like manner. Such passive convection process is favored by the upright disposition indicated.

Another embodiment employs a plurality of concentric tubular members 512, for example from two to ten members, with alternating anode-cathode dispositions in a radial direction, and suitable spacing between members. Such spacing can be maintained by inactive insulative supports, if necessary. The resultant array of nested sleeves is adapted to supply hydrogen to alternate spaces between anodes, in a non-leaking manner. This concentric structure is compact and useful where space is limited, and is lightweight and freely breathing. Multiple such structures can be designed to interfit, end-to-end, along an axis and be readily ventilated.

Also, part or parts of the tube member 512 could be of an inactive material, for example for support purposes, if desired. Thus vertical struts, or a lattice could be incorporated in the construction for strengthening purposes.

The tube member 512 is closed by an upper end cap 520 and a lower end cap 522, each of which is appropriately recessed, or otherwise adapted, as at 524 and 526 respectively, to accommodate and hold an end of the tube 512. Preferably, such recessing includes free space, or a clearance to accommodate vertical expansion of the electrolytic member 516 with use.

Lower end cap 522 is further equipped with an anode connector 528, a cathode connector 530 and a hydrogen connector 532. The end caps 520-22 can be plastic moldings and are structures to seal against hydrogen leakage so that the only pathway for hydrogen admitted through connector 532 to leave the cell, is through the anode 514. The connector 532 can be a simple male-configured screw-threaded molding as shown, but can clearly have other constructions, such as female, snap-connection and the like. It can be molded integrally with the end cap 530, or can be a separate, possibly lightweight alloy, element pressed or screwed into the end cap 530. The connector 532 should be robust and secure, capable of being tightened on to a cooperative supply connector sufficiently to prevent hydrogen leakage. A relatively wide-bore connection is preferred for free passage of hydrogen at a low pressure. Gaskets can be used for end sealing the tube 512 into the end caps 528-530, if necessary.

Both end caps 520-22 are plug-like and have substantial thickness in the vertical direction to provide substantially rigid, lightweight, but dimensionally stable, end supports for the tubular cell member 512. While both electrical connectors 528-530 are shown at the same end of the cell as the hydrogen connector 532, to facilitate service connections to assemblages or banks of cells, one or both connectors 528-530 can be provided at the upper end of the cell in the upper end cap 520, if desired.

Where a more complex spiral or multiple concentric tubular member structure 512 is employed, the end caps 520-522 can be adapted to provide closure and support, their purposes being to support the tubular electrolytic structure or structures 512 in a manner that also permits definition of a sealed hydrogen chamber or chambers in which anode or anodes 514 is or are fully exposed to hydrogen. Thus the end caps 520-522 can have spiral or multiple concentric recessing mating with the ends of the tubular member 512, and may be ducted or ported for the admission of hydrogen as required.

The cell shown in FIG. 13 is a single cell with single opposed connectors 528-30, each of which is constituted by a right-angled conductive metal stamping such as brass which is embedded in the end cap 530 and adhered or pressed into contact with a respective surface of the anode 514 or cathode 518. A variety of alternative connector arrangements is possible in keeping with the spirit of the invention, according to mechanical convenience and the desired electrical output. For example, where the tubular fuel cell has a multi-cellular construction, as suggested by the embodiment described with reference to FIG. 8, a plurality of electrical connectors can be disposed around the end cap 530 or, more efficiently the cells can be internally connected, either in series or in parallel, depending upon whether voltage or current capacity is desired, to a common output connector such as 528 or 530.

The tubular-cell embodiment shown in FIG. 13 can employ any of the individual cell constructions and materials described elsewhere herein that can be conformed to a tubular shape. Each electrode 514 and 518, is preferably self-supporting and substantially rigid, and, as described hereinabove, can be formed of graphite or carbon fiber, supported, if necessary, on a suitable porous matrix material which can be polymeric or a paper. As described above, catalytic means are provided at the anode 514 and at the cathode 518 at or in the vicinity of the surfaces mating with the electrolytic member 516, to dissociate hydrogen and oxygen molecules respectively. Such catalytic means can, as described herein, be constituted for example by deposits of finely divided platinum-group metals, such for example as platinum black, with a water-rejecting matrix at the cathode, said deposits being made on the appropriate electrode surface.

Preferably each electrode 514, 518 has machined ends for a good mechanical fit within the end caps 528–530.

The electrolytic member 516 is a solid thin member, in other words a film, of thickness as indicated hereinabove, with a non-fluid, ion-exchange matrix constitution. As described above, it can be a proton-exchange membrane which selectively promotes transport of hydrogen or hydroxonium ions or other cations while resisting passage of anions. The electrolytic member 516 is quite thin, and is preferably relatively soft and flexible to conform closely with the electrode surfaces. Polymers offering a proliferation of covalently bonded strongly electronegative radicals such as a perfluorosulfonic plastic, as described herein, are suitable.

The electrolytic member 516 is pressed into gas-tight, sealing contact with the anode 514 and the cathode 518, in a manner that preferably maintains contact over an extended area in a substantially continuous manner. Maintaining adequate contact between the electrodes and electrolytic members is a problem with prior art hydrogen fuel cells, because of a tendency for the electrolytic member to swell as water is formed. Prior art designs can resort to rather heavy, unwieldy means for applying adequate pressure to contain such swelling. The aspect of the invention embodied in FIG. 13 provides a simple, elegant solution to this problem.

This embodiment is uniquely adapted to overcome potential problems, such as swelling, that may be brought about by the generation of water in the cell especially at the cathodic surface of, or in, the electrolytic member 516. By constraining the electrolytic member on a rigid mandrel constituted by the inner anode 514, with a sleeve constituted by the outer cathode 518, swelling is controlled and resultant distortion of the electrodes can be prevented. Such swelling and distortion can, if not controlled, cause areas of loss of contact between the surfaces of the electrodes 514, 518 and the electrolytic member 516 resulting in loss of efficiency of the cell and, possibly, hydrogen leakage.

This desirable tight sandwiching of the electrolytic member is enhanced by the slight inward taper which the electrodes 514, 518 have in an upward direction. This enables them to be snugly interfitted, compressing the electrolytic member 516 between them, in a simple and effective manner which subjects it to great pressure. Also, potential lateral expansion of the electrolytic member is translated into lengthwise displacement. By placing the tubular electrolytic member 516 between the concentrically mounted tubes constituted by the electrodes 514, 518, the electrolytic member 516 can expand longitudinally as water is synthesized within it but, in an adequately constructed embodiment, cannot force the electrodes 514, 518 apart to break contact with the electrolytic member 516. To the contrary, expansion of the electrolytic member 516, owing to water synthesis, is now harnessed to the ends of cell efficiency, causing great pressure to be exerted between the electrolytic member 516 and each electrode 514, 518, ensuring good wide area contact therebetween.

The frusto-conical geometry provides excellent mechanical advantage enabling great lateral or radial pressure to be applied between electrodes 514, 518 by means exerting relatively modest lengthwise forces on the electrodes. The requisite lengthwise pressure can be built in on assembly of the fuel cell, or could be applied externally by clamping or housing means, while clearance in the end caps 528–530 accommodates lengthwise expansion. Simple friction from a tight push fit can be adequate to maintain the requisite pressure. The overall frusto-conical shape when extended to end cap recesses 524, 526 assists such fit, and a press-fit design can be achieved in various mechanical ways, for example, by providing additional lengthwise clearances to receive an electrode 514 or 518, one such clearance being provided in each end cap 528–30 so that the electrodes 514 and 518 have room for limited relative lengthwise movement.

One assembly method which can readily pressurize the members lengthwise employs a first slightly conical graphitic tube as inner electrode 514, over which a thin flexible tube of a plastic electrolytic member of a suitable material, for example NAFION (trademark DuPont) is drawn so as to fit snugly. A second slightly conical graphitic tube, slightly wider than the first, is then drawn down tightly and snugly over the electrolytic member on the first graphitic tube. Platinum black catalyst material is applied to the electrodes or electrolytic member, as described above. The end caps 528–30, with gaskets if used, are pressed on to this assembly or, in a modified embodiment, screwed on, and the hydrogen connector 532, if not present on the lower end cap 532, is attached. In use the assembled fuel cell can be screwed into a manifold pipe for the supply of hydrogen.

This assembly method provides an economical and easy manufacturing process and a simple, reliable product.

Since electrical output is related to the surface area of the electrode-electrolyte interface, the output per unit volume is inversely dependent upon the radius of the electrode tube. Thus, optimal dimensioning will depend upon considerations of attainable curvature of the electrode elements and adequate hydrogen supply into a small bore electrode tube, the latter being somewhat length-dependent. Hydrogen connectors could of course be supplied to both end caps 528–30, but to do so would add complication and expense. The effective length of the cell will be limited by the structural strength of the electrodes 514 and 518, noting that their thickness is limited not only by weight considerations, but also by the need to admit hydrogen and oxygen to the electrolytic member 516. At this time a length of about 15 cm. and a gross diameter of about 5 cm. are suitable dimensions for a preferred embodiment. Inert cage or porous skin members could reinforce the electrodes 514, 518 but again, would complicate and add to the expense of a product that must be simple, reliable and inexpensive if it is to be competitive.

The inventive embodiment as shown in FIG. 13, what may be termed a tubular fuel cell, has the additional merits of facilitating the supply of both hydrogen and oxygen to the electrode assembly 514-518 and also of facilitating the removal of water vapor. The open interior of the cell ensures efficient distribution of hydrogen over the full available surface area of the anode 514, while the upright disposition and convex outer cathode surface promote convective ventilation. The exposed exterior surface of the cathode 518 can readily be simply exposed to ambient air, or housed or shrouded, and subjected to forced air or oxygen flow which will both provide cathodic oxygen and remove water vapor.

If desired, vertical spacers can be provided to position the end caps 528-530 vertically in relation to the electrodes 514, 518, and to maintain a desired initial or working pressure on the electrolytic member 516. Such spacers could be provided with resiliently yieldable means to maintain a desired pressure range on the electrolytic member 516. Alternatively, the end caps 528-530 could be mounted to similar effect, for which purpose they may be attached to the electrodes 514, 518 in a manner providing for limited relative lengthwise movement between the electrodes 514, 518. Such working pressure can thus be somewhat relieved to prevent mechanical rupture, but should be maintained at a substantial level, to maintain good contact. In general however, the objectives obtained by this embodiment of the invention are to maximize the pressure on the electrolytic member 516, within the limits of mechanical integrity.

As will be clear from the foregoing description, in use, an inventive cell such as is shown in FIG. 13, is supplied with low pressure hydrogen gas through connector 532, to fill the volume within the tube provided by electrodes 514 and 518, while the outer surface of cathode 518 is exposed to air, and preferably to a forced flow of air that will remove water vapor product. As explained above, catalytic action liberates active hydrogen species at the anode which migrate into the electrolytic member to meet and combine with active oxygen species catalytically liberated at the cathode, building a potential difference that can drive an external flow of electrons in the opposite direction. Electricity is tapped from connectors 528-30.

In addition to ease of manufacture, the tubular fuel cell embodiment described here and shown in FIG. 13, provides a simple, reliable and effective solution to many problems of hydrogen fuel cells, providing new ways to overcome swelling of the electrolytic member, of supplying hydrogen and oxygen and of removing water vapor. It is also suitable for assembling into batteries or banks to provide aggregated electric power output.

Figure 14:
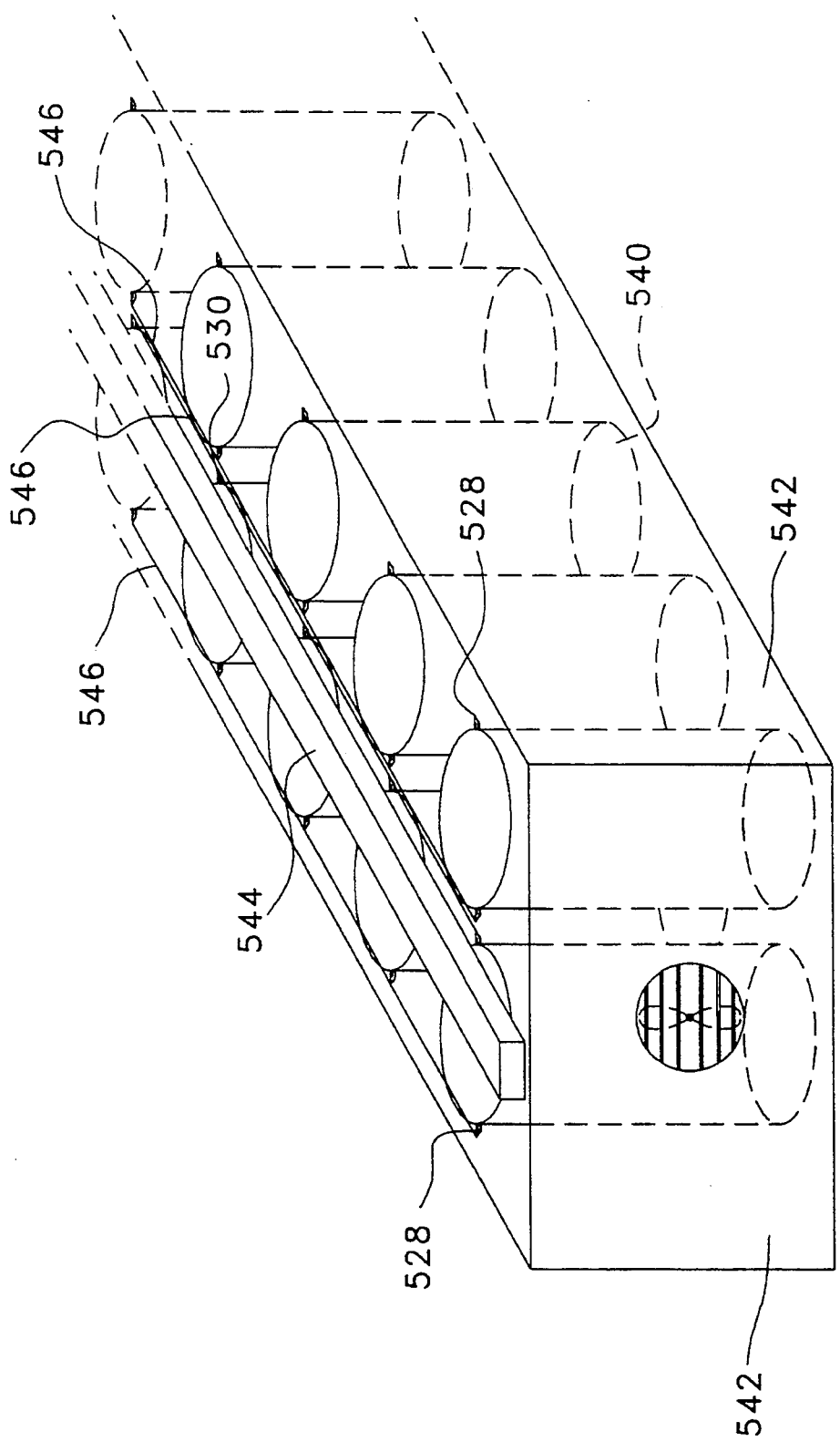
FIG. 14 is a schematic perspective view of an array of tubular fuel cells according to the embodiment shown in FIG. 13.

FIG. 14 is a simplified schematic view of an array or battery structure illustrating some of the ways the inventive tubular fuel cells described with reference to FIG. 13 can be assembled together. In FIG. 14 two rows of such tubular fuel cells 540 are mounted in a box-like housing 542. Overlying one row is a hydrogen manifold 544 to which each cell 540 in that row is connected. A similar manifold, not shown, is provided for the second row of cells 540 and could interconnect with the first. Busbars 546, not all of which are shown, run between rows of connectors 528-30. With the connectors 528-30 symmetrically disposed on the cells 540, the orientation of adjacent cells will determine whether they are connected in series for voltage or in parallel for current. This flexibility permits an array readily to be adapted for diverse applications. The busbar electric pickup is clearly very simple and can be readily adapted to many other configurations and is suitable for extension to large and very large arrays with mixed series-parallel connections for balanced power output. Many other electrical connection possibilities will be apparent to those skilled in the art.

At the near end of the housing 542 is a fan 548 to move air within the housing for provision of oxygen and removal of water vapor. The fan 542 can, if desired, be powered from one or more cells 540. On a vehicle in motion adequate air flow could be provided by scoops and ducted to the housing 542, with the fan 542 being operative primarily when the vehicle is stationary. In a vertically disposed embodiment air flow can be provide by or assisted by convection as the cells generate heat.

As suggested by FIG. 14, tubular cells 540 with a circular section are suitable for hexagonal close-packing, providing volume optimization. Adequate clearances are left for structural purposes and to provide adequate airflow. Such hexagonal disposition also assists air distribution by minimizing by-pass routes.

Clearly there is no particular limit to the number of cells 540 in an array, and there may be tens or even hundreds in a row. Equally, there can be many more than two rows and other housing structures will be apparent.

The enclosure provided by the housing 542 provides the possibility of using substantially pure oxygen or oxygen-enriched air rather than air, either for better cathode efficacy or to prevent formation of undesired ammoniated by-products at the cathode 518, from dissociated, activated nitrogen.

If the possibility of hydrogen leaks represents a perceived hazard, the manifold 544, and other hydrogen-containing components, including tanks, can be shrouded to enclose them and separate them from any of the connectors. Such shrouding could be purged of small amounts of hydrogen by constant throughput of air, possibly again, scooped from the slipstream of a vehicle. It is to be noted that the danger from hydrogen relates to accumulations, especially around electrical components that may generate sparks, especially when serviced. Small amounts of hydrogen, adequately diluted with air, present little risk. Such hydrogen-equipment shrouding could harbor a suitable location, such as an exhaust therefrom for a hydrogen-sensitive leakage indicator.

Another aspect of the invention relates to solving the problem of providing, in a simple and economical manner, a permanent bond between the electrodes and the electrolytic member of a fuel cell which provides good electrical contact therebetween over an extended surface area. In this aspect the invention also solves the problem of incorporating catalytic material in a fuel cell in a desired location within the cell in a controlled manner.

Adlhart U.S. Pat. No. 4,175,165 discloses bonding the catalytic electrodes of a fuel cell to an ion exchange membrane by pressing the membrane between the electrodes, catalyst side towards the membrane, with the application of heat. The suggested temperature is from 200° F. to 400° F. and the preferred pressure is about 800 psi. These are aggressive conditions.

The present invention is able to achieve an improved bond between an electrode and a polymeric electrolyte in a manner employing mild process conditions. Thus, the invention provides a novel fuel cell comprising a solid or film-like polymeric proton-exchange electrolytic membrane sandwiched between layered catalytic electrodes which further comprises an adhesive system or sealant bonding said electrolytic membrane to at least one of said electrodes, said sealant being the cured product of a liquid-phase electrolytic polymer. In this aspect, the invention solves the problem of maintaining good contact between the electrolytic membrane and the electrodes under a variety of conditions.

Use of a liquid-phase electrolytic polymer enables voids to be filled and provides a conductive bridge between the two solid-phase members. Furthermore, it provides a means of introducing a catalyst material at a desired location in a controlled manner. Thus a suitable catalyst, or catalyst system, such as a finely divided platinum group metal, for example platinum black, can be incorporated in the liquid-phase polymer composition and deposited therewith to form a novel catalytic layer which is located, in a general sense between an electrode and the electrolytic member, (although some of the liquid phase will probably permeate into the porous electrode) and which bonds its neighboring layers together in a manner providing continuous electrical contact over an extended area. As described above, at the cathode a hydrophobic material such as polytetrafluoroethylene can be included in the catalyst system, which is here furnished in the liquid-phase sealant, to throw off electrolytically synthesized water.

Preferably the liquid-phase sealant is applied to one mating surface either on an electrode or the electrolytic member, with the electrode or electrolytic member in the solid state, the other member is applied to the resultant adhesive-coated surface while the adhesive is still wet, and pressure is applied to eliminate voids before or during curing of the sealant, which can be effected with heat, if appropriate. Preferably, both electrodes are bonded to the electrolytic member by means of a conductive sealant as described herein.

The conductive adhesive bonding between electrolytic member and electrode afforded in this aspect of the invention also provides mechanical strengthening of the inventive fuel cell and may add various degrees of rigidity. With this in mind, the bonding should be controlled according to the desired shape or flexibility of the cell. Thus for spiral, or frusto-conical or other more complex shapes, the electrodes, electrolytic member and any substrate, if used, can be preformed to shape and then assembled with the described sealant. Alternatively, the complete assembly from electrode to electrode, with adhesive, and optionally with a substrate, can be assembled and then shaped prior to curing of the sealant. If desired, a strengthening polymer, preferably a conductive or hydrogen-transporting polymer, can be incorporated in the sealant, for example an epoxy resin. However, any such strengthening polymer should not comprise hydrogen ion transport across the electrode-electrolyte interface.

Clearly, the sealant should be capable of transporting protons and accordingly, a proton-exchange polymer is suitable such, for example as a perfluorosulfonic acid polymer, as described above for the electrolytic member, preferably NAFION. Thus the adhesive can be, and preferably, for bond integrity and electrolytic continuity is, the same material as the electrolytic member, with the addition of a catalyst. An equivalent result could be obtained, with suitable process control, by depositing the electrolytic member, partially curing same, applying catalyst particles to a wet surface of the deposited electrolytic member, further partially curing the polymeric electrolytic member, applying an electrode to the still-wet catalyst-treated electrolytic member surface, preferably with pressure, and completing the curing.

The liquid-phase sealant can be applied in a silkscreen process which enables the adhesive to be applied to an electrode or electrolytic member surface in a well-defined pattern to match, overlie or otherwise relate to the shape or pattern of the various cell elements, especially, for example, for the lapped multi-cell configurations of fuel cell described hereinabove with reference to FIGS. 1–12. Preferably, the adhesive layer extends to and around the edges of the electrodes, to coat them and reduce edge effects, preferably with a fillet.

The polymeric material used for the electrolytic member, or for the sealant, or for both, is preferably selected from the group consisting of perfluorosulfonic acid polymers, homologs, analogs and copolymers thereof, and as stated above is preferably NAFION.

In the partial sectional view of FIG. 15 an inventive fuel cell embodying adhesive electrode-bonding comprises thin-layer or laminar electrodes, namely an anodic electrode or anode 614 and a cathodic electrode or cathode 618, bonded to either side of an electrolytic member 616, by adhesive layers 620 and 622 respectively. The anode 614 is supported on an oxygen-porous substrate 615. Boundaries that can be defined by silkscreen resists are indicated by arrows 624. The structure is similar to that shown in FIG. 4, with the cathode 618 cascading down to contact a trailing anode 614 and provide a series connection thereto. The only conductive path from cathode 618 to its underlying anode is through an adequate thickness of electrolytic member 616. It is insulated from a trailing cathode by insulative fill. FIG. 15 is a schematic representation of a fuel cell manufactured by depositing a plurality of elements from liquid phase. Successive layers are slightly set back from their respective support layers. However, the adhesive layers 620, 622 could be extended downwardly, more completely to cover the next underlying layer, if desired.

Figure 16:
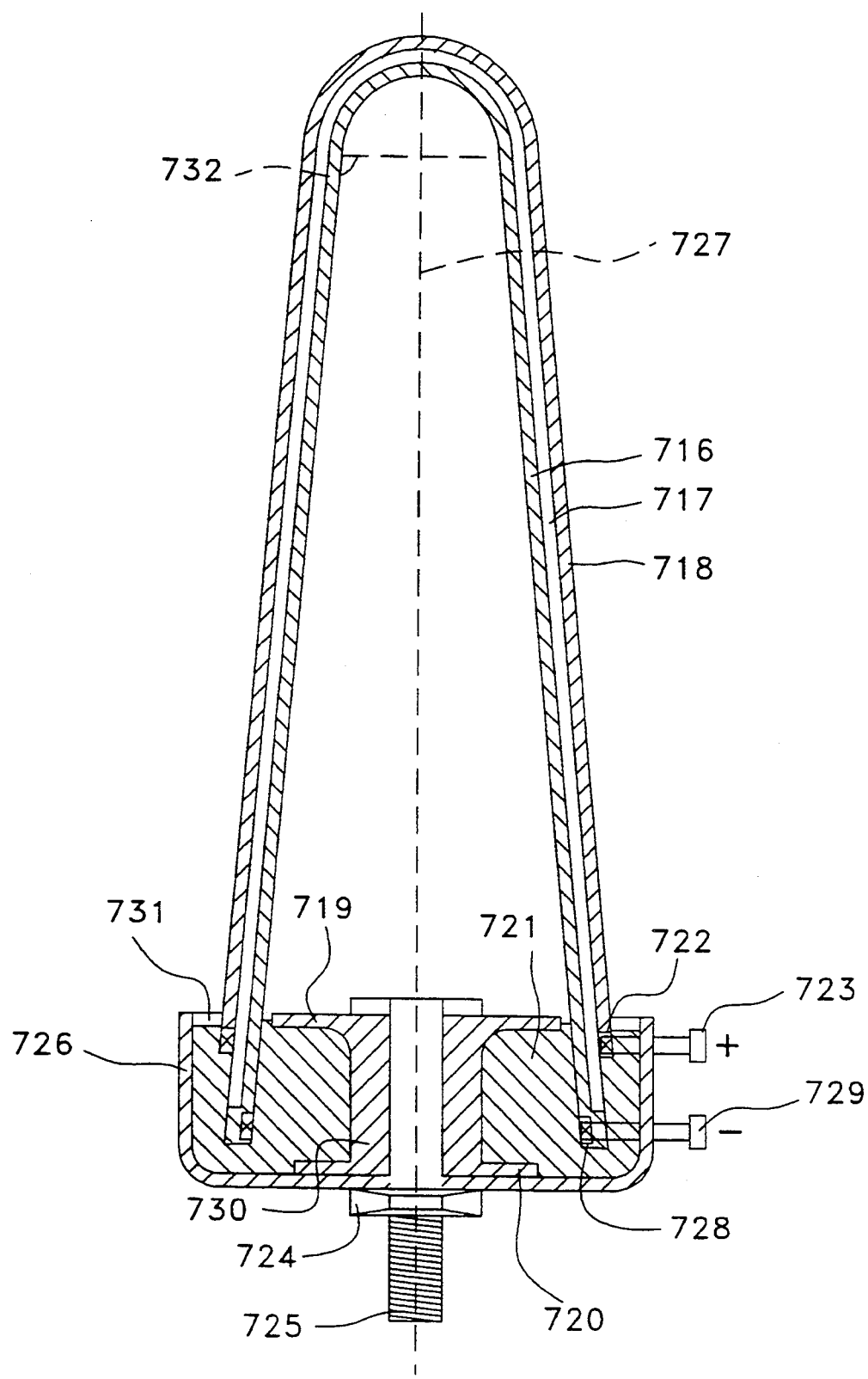
FIG. 16 is a vertical section through another, in this case conical, fuel cell embodiment of the invention.

The embodiment of fuel cell shown in FIG. 16 bears substantial similarities to the tubular structure of the FIG. 13 embodiment. This embodiment is a sealable self-tightening fuel cell which has few components, can be readily assembled and can be sealed against hydrogen leakage in a one-step process.

Significant differences from the tubular or tapered cylinder fuel cell shown in FIG. 13, are that there is no upper end cap such as 520 and the conical cell disclosed here has a lower end cap in which all joints susceptible hydrogen leakage are located and which can be flooded with sealant to prevent such leakage. To this end, the cell has a layered electrode assembly formed into a rounded-tip conical shape much like a traffic cone.

Referring to FIG. 16, the substantially conical fuel cell shown comprises in a preformed layered structure an anodic electrode 716, a cathodic electrode 718 and an electrolytic member 717 sandwiched therebetween. The tapered and curved shapes of these members also provide for strains generated by swelling of the electrolytic member 717 to be translated into clamping forces promoting contact between the electrodes 716, 718 and the electrolytic member 717. These three members are carefully manufactured one-piece elements which provide an integral coherent structure free of pinholes or other sources of hydrogen leaks. Hydrogen can only traverse this electrode structure by permeating through it whereupon electrocatalytic activity oxidizes the flammable gas to innocuous water.

The substantially conical electrode structure is closed in a hydrogen-tight manner by a lower end cap comprising a dish like base 726, and a disk-like base plate 719 which cooperate to provide a sealant compartment in which the circular ends of the electrolytic elements 716-718 are received. For the admission of hydrogen to the cell, base plate 719 has a central hollow stem 730 with a threaded extension providing a hydrogen connector 725 passing through a central opening in base 726, where it is secured to base 726 by an external holding nut 725. A ring gasket 720 provides a coarse seal between the stem 730 and the base 726.

An optional closing ring 731 can be provided outside the electrode structure 716-718 to retain the electrode assembly. If desired, lugs or threads can be provided for closing ring 731 to snap or otherwise lock into place around the top of base 726. The ends of the cathodic electrode 718 and the anodic electrode 716 are press-fitted with a cathode connector ring 722 and an anode connector ring 728 respectively and the electrodes 716-718 are preferably plated where they engage the connector rings 722, 728, to insure a good electrical connection to the connector rings, for example with copper, silver, gold or platinum or the like.

The base components 719, 716 can be formed of any suitable material, for example stainless steel or a strong, substantially rigid and dimensionally stable plastic for example LEXAN, General Electric Company. In a preferred embodiment they are plastic moldings formed integrally with the hydrogen connector 725. If the electrode structure has a straight configuration within the base, paralleling the axis 727, closing ring 731 can be formed integrally with base 726, for example as a molded lip.

Take-off terminals, 723 positive, and 729 negative, provide external connections to the connector rings 722, 728 and thence to the electrodes 716, 718 and are accommodated in a suitable opening or openings in the base 726. Except for these terminals and openings, the fuel cell is substantially symmetrical about a central axis 727, the parts shown having mostly circular cross-sections in horizontal planes perpendicular to the plane of the paper.

The annular sealant compartment defined between base 726 and base plate 719 is charged with a suitable sealant which is preferably somewhat adhesive. The sealant is of course insulative and is preferably also initially plastic and flowable, to provide good fill of crevices and is preferably curable to a hard or moderately resilient mass so as to seal possible hydrogen leakage areas between for example the electrodes 716, 718 and their mechanical supports constituted by the base members 719, 726; between the electrodes 716, 718 and the electrolytic member 717; and between the base 726 and the hydrogen connector 725, the closing ring 731 and the base plate 719; and to seal any terminal opening in the base 726. Upon curing the sealant also imparts structural stability and rigidity, to the fuel cell and, if the sealant is a resilient material, provides cushioning against shocks, for example accidental blows on the outer electrode 718 incurred during installation or maintenance.

To ensure elimination of voids, the sealant can be applied under pressure with excesses that emerge being stripped off. Many sealants are suitable to meet the foregoing criteria, for example injection moldable materials such as rubbers or silicone rubbers.

By forming the electrode elements as one-piece structures with a closed end and a single open end, potential hydrogen leaks can be isolated to a single compact region at the mouth of the electrode structure where such potential leaks can be contained, sealed and eliminated. This inventive structure and process of manufacture effectively overcomes difficulties in sealing fuel cells which are well known to the art.

The blunted-cone shape is a preferred embodiment of such a structure in which the electrodes are continuous and smoothly curved to reduce stresses or weaknesses and are reasonably compact to provide a good surface area to volume ratio with an assemblable, nestable shape.

To promote intimate contact between the electrodes 716, 718 and the electrolytic member 717, mechanical means to urge them into tight engagement can be provided. For example, electrodes 716, 718 can be mutually stressed during assembly, in opposing axial directions, by providing a support abutment in the base 726 beneath the end of inner anodic electrode 716 and pressing closing ring 731 downwardly on outer electrode 718.

However, it is preferred that, prior to use, the electrodes 716 and 718 are snugly nested together, with the electrolytic member 717 sandwiched between them, the assembly resembling a small stack of nested paper cups. Application of sealant anchors the electrodes in place and operation of the cell wets the electrolyte 717, causing it to swell. The tapered shape harnesses this swelling to press each electrode 716, 718 into intimate electrical contact with the electrolytic member 717.

To accommodate manufacturing tolerances or lengthwise adjustments between the electrodes 716, 718, the inner anodic electrode 716 can be decapitated for example where shown by the broken line 732.

Any of the electrode or electrolytic materials and structures described herein that are suitable for configuration as described with reference to FIG. 16 can be used for this embodiment, especially those described a suitable for the embodiment of FIG. 13. Preferably, the electrodes 716, 718 are bonded to the electrolytic member 717 by a proton-exchange adhesive such as is described herein with reference to the embodiment of FIG. 15.

A preferred material for the electrodes 716, 718 and also for the electrodes 514, 518 of the FIG. 13 embodiment is a porous, rigid, graphite, or carbon fiber. Such a member can be manufactured from graphite paper or cloth or from a carbonized polymeric organic cloth. The cloth can be, for example a woven polyester fabric, which is preformed to shape. The resultant sock or tube is then heat-treated by baking or firing it in an inert atmosphere to decompose the polymer, drive off volatiles and yield a conductive graphitic skeleton which has significant structural strength and is self-supporting. Such products are supplied by Fiber Materials, Inc. Biddeford, Me.

Appropriate thicknesses of electrode 716, 718 lie in the range of about one-sixteenth to one quarter of an inch and are preferably about one eight to three sixteenths of an inch for a cell structure of the order of a foot or less in length and several inches, for example three or four, in diameter.

The fuel cell embodiment described with reference to FIG. 16 is not only a safe and efficient electricity generator, but is also designed for economical mass production. An electrode sub-assembly and a base or end cap sub-assembly can be prepared with little input of labor. Final assembly comprises the capping of the electrode sub-assembly with the base sub-assembly, followed by a brief sealant injection operation which closes hydrogen leaks and bonds the sub-assemblies together.

The electrode structure provides an enclosed chamber for hydrogen admitted through the base assembly, which base assembly serves to close off the electrode structure. All edges of the electrode structure are received into the base sealant compartment where they may be effectively sealed against hydrogen leakage.

Because individual cell output provides relatively low voltage at a substantial amperage, it is important to take steps to preserve the relatively modest potential differences generated and avoid any voltage losses, for example through contact resistance. To this end, as described above, plating, and contact rings may be employed. Another strategy is to provide additional current-collecting structures that pick up current from locations distributed across the external surfaces of the electrodes. One possible arrangement for achieving this end is shown in FIGS. 17 and 18 which schematically depict structures which can decrease the distance traveled in the electrode by the carrying currents, facilitate current collection and prevent losses.

As shown, conductor wires 730 are channeled in lengthwise troughs 730. FIG. 17, which is quite schematic shows an outline of a section through a cone-like fuel with eight such conductors 730 distributed uniformly around its perimeter in troughs 732. As the small segment of cross-section which is illustrated in FIG. 17 shows, anodic conductor wires can be similarly distributed in longitudinal troughs 738 in the surface of the anodic electrode 716. Preferably, conductor wires 730 and 736 are circumferentially staggered so as to stagger the troughs and bulges in the electrolytic structure. To protect conductor wires 730 and 736 from exposure to hydrogen, plastic filler 734 can be used, as shown in FIG. 18, and this can be a conductive filler. Filler 734, depending upon choice of material, can provide stiffening which stiffening can be augmented by an appropriate gauge of conductor wire 730 and 736. If desired, transversely or circumferentially disposed conductor wires (not shown), intersecting the upright wires 730, 736, can be similarly provided to create a frame, which can add substantial support. Such frames can be used to press and hold the electrodes 716 and 718 in tight engagement with electrolytic member 717. The wires of such a current-collecting framework should, at least on the cathode side of the cell, be completely protected from exposure to hydrogen to avoid contaminating the hydrogen with metallic hydride, for example, by coating or embedding the wires 730, 736 with plastic as shown. The end terminations of any conductor wires, such as 730 and 736, may be soldered or welded to connector rings 722 and 728, and, in order to avoid hydrogen exposure, are preferably buried in sealant 721.

The arrangement of longitudinal conductor wires 730 and 736 described with reference to FIG. 17 reduces the maximum distance any current need travel, in its respective electrode, from about the full length of the electrode to about half the maximum circumferential spacing between conductors 730 or 736.

The invention disclosed herein extends to novel manufacturing processes including the direct formation of an electrolytic member on a surface of a shaped self-supporting carbon-fiber electrode, especially on the convexly curved outer surface of an anode.

The electrolytic member 717 can be prepared by molding a suitable proton-permeable polymer or membrane, such for example as the perfluorosulfonic polymer described herein, to fit closely over the anodic electrode 716, employing pressure or vacuum with or without heat.

However, a preferred manufacturing process for the electrode assembly comprises coating a shaped anode with a liquid, curable proton-transport polymer, or proton-exchange membrane material, notably the perfluorosulfonic polymer repeatedly recited herein, by dip-coating or spraying a form, or the anode itself, into or with the polymer at about room temperature, and then curing it, for example, by heat drying. A concentration in the range of about 1 to 25%, for example from 3 to 10%, by weight of the proton-transport polymer can be used as a coating or spraying solution, with a concentration of about 5% being preferred. A suitable such proton-exchange polymer solution is a 5% solution of a perfluorosulfonic acid resin in a hydroalcoholic solvent system comprising for example, isopropanol and water.

The coating step is repeated one or a number of times to the required thickness of electrolytic polymer, with a curing step between coating cycles. Each such coating step may include one or more coatings with a curable liquid electrolyte containing a suitable catalyst such as finely divided platinum.

Preferably, the curing step is a two-stage process. In a first stage solvent is driven off at a moderately elevated temperature in the range of about 40°-80° C., for example, for five to ten minutes or less at about 60° C. A second higher temperature curing or drying stage is important to bake out impurities or potential membrane contaminants that may impede the membrane's proton-transport performance. This second stage should attain a temperature in the range of about 110°-150° C. for at least a minute, while 5 to 10 minutes at about 120° C., is satisfactory. Other suitable purification techniques will be apparent to one skilled in the art, especially for the destruction of biologicals, including irradiation, microwave baking, and the like.

Upon completion of the electrode-coating process, the coated anodic electrode can be pressed together with a mating cathodic electrode into a single component to which the connector rings 722, 728 with terminals 723, 728, are fitted to complete the electrode sub-assembly.

As described above, this sub-assembly is joined with the base assembly and sealed to complete the fuel cell. If desired, mounting extensions can be provided on the base 726.

It will be appreciated that the various configurations adaptations and dispositions of the cell elements, the materials employed and the process steps that have been outlined are generally suited to, or particularly dispose the invention for, realization by mass production. Modifications of these features that better suit the invention to mass production or improve its production features, will be apparent to those skilled in the art.

Any of the electrode assemblies described herein can employ blow-molding or vacuum molding of a proton-exchange polymer to produce a polymeric electrolyte film or a shaped member supported on a form. This technique is particularly applicable to the lapped multicellular constructions described with reference to FIGS. 1-12 and 15. These constructions preferably employ a very thin electrolytic member, with a thickness of for, example from 0.001 to 0.020 cm., which is to say, from about 10 to 200 microns. Such a film or member can be rendered catalytically active by coating one, or preferably both, surfaces with a slurry of catalyst particles preferably intermixed with conductive carbon particles, in view of the importance of enhancing conductivity and reducing resistance in every feature of the cell's electrical construction. A suitable commercially available product comprises about 20% by weight platinum codeposited on a conductive carbon such as sold under the trademark "VULCAN" by Johnson-Matthey Inc., Malvern Penn. As described above, the catalyst is preferably finely divided platinum, and the slurry can comprise a conductive proton-exchange polymer, preferably a perfluorosulfonic acid polymer. The electrodes for such cells are preferably some what thicker than the electrolyte membrane, about 0.01 to 0.05 cm.

Noting that substantial quantities of water are synthesized at the cathode, it is desirable to enhance water-removal therefrom without impairing its conductivity. This can be achieved by coating a graphitic or porous carbon or carbon fiber cathode, with a dilute suspension, for example 5% by weight solids, of polytetrafluoroethylene particles (for example "TEFLON", trademark DuPont Company) and sintering it to provide a fused coating which encourages the cathode to shed water. The cathode remains conductive but allows water to pass easily through it, so that synthesized water can be easily removed or evaporated, or will drain.

It is believed clear from the foregoing description, that an important objective which is achieved in the practice of the present invention is to ensure intimate contact between the electrodes and the electrolytic member between them. This contact should preferably involve positive pressure applied by any of the various means disclosed herein, and that pressure should extend over the whole contact area in a reasonably uniform manner, if possible. It is of particular importance to ensure that such widespread intimate contact between electrode and electrolytic member or proton-exchange membrane be maintained during and after extended use of the cell. Normal use of the cell generates water, which will swell the membrane, to an extent of 15-17% in a NAFION (trademark) polymeric electrolytic membrane, creating great separation pressures on the adjoining electrodes. These forces tend to rupture the cell and are effectively contained or even harnessed by means of the invention described herein. In a relatively sophisticated construction designed to relieve these membrane-swelling forces in a lateral direction, thereby to maintain and promote intimate contact with the electrodes, the wound, lapped multicellular arrangement described with reference to FIG. 8, can be rolled around or mounted on a slightly tapered tube or tubular support, and covered and clamped in place by a second slightly tapered tubular cover or sleeve, after the manner of the mechanics of the construction described with reference to FIG. 13.

The preferred embodiments of inventive fuel cell described and shown herein provide several constructions in which a hydrogen chamber overlies the cell's exposed anode surface so that hydrogen can be introduced into the chamber and, under pressure, will be caused to flow through the anode to the electrolyte film where it is catalytically stripped of electrons. The resultant protons or hydroxonium ions are transported through the film and to the cathode, where they meet and combine with similarly ionized oxygen atoms, to form water and generate an electric potential difference across the cell. While some embodiments show an enclosed cell construction with the anode and hydrogen chamber contained within the cell, and a cathode supplied with oxygen disposed on the outside of the cell, this disposition could be reversed, placing the cathode on the inside and shrouding an external anode surface with a hydrogen chamber. Also, an external cathode can be shrouded for the supply of oxygen and the removal of water.

Hydrogen must be supplied in a contained, pressurized manner involving chambering or ducting, albeit usually at a low or modest pressure of a few pounds psig. Very little pressure is needed to maintain a hydrogen atmosphere at the anode. In practice, if hydrogen is generated in situ, from a metal hydride, for example from a portable canister, (the use of which coupled to one or more of the fuel cells disclosed herein constitutes a further embodiment of the present invention,), then, depending upon what flow regulation means are also coupled in circuit between the hydrogen generator and the fuel cell, the hydrogen pressure at the anode may be substantially that of the generator.

This pressure is subject to substantial fluctuations between, for example 30 psig or more, and a tenth of a pound or less. Preferred embodiments of fuel cells according to this invention are able to operate satisfactorily with such pressure variations. Hydrogen requires special measures to prevent leakage, some of which have been described here, because of its high permeation rates through many materials, and its flammability. Typical specifications call for molded plastic seals for hydrogen, with a thickness of at least one eighth of an inch (3 mm.). Furthermore, contamination of the electrolytic structure with metal hydrides carried in on the hydrogen stream, should also be avoided, as they interfere with proton transport. Accordingly, the hydrogen supply should avoid such contamination, and may, if desired pass through a water or acid trap, or some other filter system, to remove such hydrides. Additionally, or alternatively, hydrogen-contacting structures should be plastic or high grade stainless steel, although of course, contact with noble metals is permissible.

While oxygen can be delivered to the cathode simply as a forced, or even convective, air stream, it is preferred that pressurized oxygen be supplied in a contained, ducted manner to the external surface of the cathode.

While the invention has been described with reference to a hydrogen fuel cell, other flammable gases besides hydrogen can be contemplated as being usable in the practice of the invention, for example, methane, ethane, propane or acetylene, natural gas, producer gas and vaporized gasoline, methanol or ethanol. However, such gases or vapors do not have hydrogen's advantages of lightness and having a single, harmless combustion product, water. Moreover, other gases will have larger molecules than hydrogen has and may generate ions that do not satisfactorily migrate to the electrolyte, may not be satisfactorily catalytically activated, as necessary and can have other drawbacks not displayed by hydrogen. Also, hydrogen is more polar than carbonaceous flammable gases and therefore more ionizable. Thus, hydrogen is the strongly preferred fuel for the fuel cells of this invention, although other fuels may be used.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A hydrogen fuel cell having a layered electrode structure said fuel cell comprising:
   a) a layered porous anodic electrode;
   b) ducting to supply hydrogen to said porous anodic electrode;
   c) a layered porous cathodic electrode exposable to oxygen;
   d) a layered electrolytic member between and in contact with said anode and with said cathode for transporting ions therebetween;
   e) catalytic means at said anodic and said cathodic electrodes for ionizing hydrogen and oxygen respectively;
   f) a support for said electrolytic structure, said support engaging one of said electrodes; and
   g) restraining means engaging said electrodes to constrain said electrolytic member between and in contact with said electrodes;
   wherein said restraining means acts to displace transverse swelling of said electrolytic member in directions generally parallel to said layered electrodes.

2. A hydrogen fuel cell according to claim 1 wherein said electrolytic structure and said thin-layer elements have a generally tubular shape.

3. A hydrogen fuel cell according to claim 2 wherein said electrolytic structure and said thin layer elements are tapered in the direction of their tubular shape.

4. A hydrogen fuel cell according to claim 2 wherein said electrolytic structure and said thin-layer elements are cylindrical.

5. A hydrogen fuel cell according to claim 1 wherein said electrodes are formed of a self-supporting graphitic material.

6. A hydrogen fuel cell according to claim 6 wherein said electrolytic structure and said thin layer elements have a frusto-conical shape.

7. A hydrogen fuel cell according to claim 2 further comprising end caps, one for each end of said tubular shape, said end caps each being recessed to receive and support an end of said electrolytic structure.

8. A hydrogen fuel cell according to claim 8 wherein one of said end caps carries ducting for hydrogen in the form of a connector attachable to a hydrogen supply and said end caps are equipped with connectors for making electrical connections to said electrodes.

9. A hydrogen fuel cell according to claim 2 wherein said anodic electrode provides an inner wall of said tubular shape, said cathodic electrode provides an outer wall, and said hydrogen ducting leads within said tubular shape.

10. A hydrogen fuel cell according to claim 2 wherein said electrolytic member comprises a highly conductive perfluorosulfonic polymer membrane sandwiched between said electrodes and in intimate electrical contact with each said electrode over substantially the entire sandwiched area.

11. A hydrogen fuel cell according to claim 2 wherein said electrode structure comprises a conductive current-collecting structure contacting said electrodes on faces remote from said electrolytic member to reduce the lengths of current paths in said electrodes.

12. A hydrogen fuel cell according to claim 12 wherein said current-collecting structure comprises a plurality of conductor wires extending across a face of each electrode ant terminating at a conductor ring in contact with each said electrode, said conductor wires being protected from contaminating exposure to hydrogen.

13. A hydrogen fuel cell according to claim 13 wherein said current collecting structure contributes mechanical strength to said electrode structure and tends to press each electrode into good electrical contact with said electrolytic member.

14. A fuel cell having an electrolytic structure, comprising:
   a) a porous anodic electrode;
   b) ducting to supply hydrogen to said porous anodic electrode;
   c) a porous cathodic electrode exposable to oxygen;
   d) a selectively permeable thin-layer electrolytic member between and in contact with said anode and with said cathode for transporting hydrogen ions therebetween; and
   e) an electrolytic sealant between at least one of said electrodes and said electrolytic member;
   wherein said sealant bonds said at least one electrode to said electrolytic member with occlusion of voids over a substantial area to provide good electrolytic contact therebetween, said sealant being a polymeric material deposited in situ from a liquid phase.

15. A fuel cell according to claim 15 wherein said sealant includes a dispersion of catalyst particles.

16. A fuel cell according to claim 15 wherein said sealant and said electrolytic member are formed of the same polymeric material.

17. A fuel cell according to claim 15 wherein said polymeric material is selected from the group consisting of perfluorosulfonic acid polymers, homologs, analogs and copolymers thereof.

18. A hydrogen fuel cell according to claim 15 wherein said electrode structure comprises a conductive current-collecting structure contacting said electrodes on faces remote from said electrolytic member to reduce the lengths of current paths in said electrodes.

19. A hydrogen fuel cell according to claim 19 wherein said current-collecting structure comprises a plurality of conductor wires extending across a face of each electrode ant terminating at a conductor ring in contact with each said electrode, said conductor wires being protected from contaminating exposure to hydrogen.

20. A hydrogen fuel cell according to claim 20 wherein said current collecting structure contributes mechanical strength to said electrode structure and tends to press each electrode into good electrical contact with said electrolytic member.

21. A hydrogen fuel cell assembly of first and second fuel cells, said first fuel cell comprising:
   (a) a first anode comprising a porous electrically conductive flexible member having a first end and a second end, said second end of said first anode being positioned opposite said first end of said first anode;

(b) a flexible first electrolytic member disposed over and in facing contacting relationship to said first anode, said first electrolytic member having a first end adjacent the first end of said first anode and a second end adjacent the second end of said first anode;

(c) a first cathode having first and second ends, and comprising a porous electrically conductive flexible member, said first cathode being disposed over and in facing contacting relationship to said first electrolytic member at least a portion of said first cathode member in facing relationship to a portion of said first anode member, said first end of said first cathode facing said first end of said first anode and said second end of said first cathode facing said second end of said first anode; said second fuel cell comprising:

(d) a second anode comprising a porous electrically conductive flexible member having a first end and a second end, said second end of said second anode being positioned opposite said first end of said second anode, said second anode being positioned in spaced relationship to said first anode with said second end of said first anode adjacent and spaced from said first end of said second anode;

(e) a flexible second electrolytic member disposed over and in facing contacting relationship to said second anode said second electrolytic member having a first end adjacent the first end of said second anode and a second end adjacent the second end of said second anode;

(f) a second cathode having first and second ends, said second cathode being made of an electrically conductive, flexible air-permeable material, said second cathode being disposed over and in facing contacting relationship to said second electrolytic member, said first end of said second cathode being adjacent said first end of said second electrolytic member and said second end of said second cathode being adjacent said second end of said second electrolytic member; and said fuel cell assembly further comprising:

(g) an electrically conductive bridge extending from said second end of said first anode to said first end of said second cathode; whereby said fuel cell assembly has a generally laminar structure and can be shaped by flexing.

22. A fuel cell as in claim 22, wherein said first anode includes a foot portion disposed in facing spaced relationship to said second anode, said first electrolytic member being positioned only over those portions of said first anode other than said foot portion and wherein said bridge is shielded from direct electrical contact with said second anode and said bridge is integral with said second cathode.

23. A fuel cell assembly as in claim 22, wherein said bridge is shielded from said second anode by a portion of said second electrolytic member which extends around and covers said second anode and said bridge is disposed on said extended portion of said second electrolytic member.

24. A fuel cell assembly as in claim 24, wherein said first and second anodes are disposed over and secured to a single gas-permeable substrate member.

25. A fuel cell assembly as in claim 25, wherein the portions of said cathodes adjacent said first ends of their respective anodes do not extend over the peripheral portions of their respective electrolytic members, whereby the ends of said electrolytic members adjacent said first ends of their respective anodes are exposed.

26. A fuel cell assembly as in claim 23, wherein said electrolytic member is a polymer material.

27. A fuel cell assembly as in claim 23, wherein said electrolytic member is NAPION polymeric film.

28. A fuel cell assembly comprising a fuel cell as in claim 23, and further comprising a plurality of additional cathodes, electrolytic members, anodes and multiple cell bridges arranged in the same manner as said first cathode, electrolytic member and anode and with said conductive bridges extending between respective anodes and cathodes.

29. A fuel cell system comprising first and second fuel cell assemblies as recited in claim 29, wherein said substrate of said first fuel cell assembly is in facing spaced relationship to said substrate of said second fuel cell assembly, said substrates lying between the cathodes of said first and second cell assemblies and further comprising a separator disposed between said substrates, said first and second substrates defining an airtight envelope and further comprising means for introducing hydrogen fuel gas into said envelope.

30. A fuel cell system as in claim 30, wherein said first and second fuel cell assemblies are disposed in a spiral configuration.

31. A fuel cell assembly as in claim 22, wherein said cathode, said electrolytic member and said anode are the product of processes involving fluidic deposition of conductive material to form said node, polymeric material to form said electrolytic member, and conductive material to form said cathode.

32. A fuel cell assembly as in claim 32, wherein said deposition is performed by a silk screen or stenciling process.

33. A fuel cell assembly as in claim 22 wherein said anodes and cathodes comprise a gas-molecule-dissociating catalyst.

34. A fuel cell assembly as in claim 34 wherein said gas-molecule-dissociating catalyst is finely divided platinum and said electrolytic member comprises a proton-exchange membrane.

35. A fuel cell assembly as in claim 32 wherein liquid water is generated within said fuel cells by catalytic electrolytic combustion of said fuel and said electrolytic member comprises a wet-operating, ion-exchange membrane.

36. A fuel cell assembly as in claim 22 wherein said electrolytic member comprises an aqueous charge-transporting medium, said fuel cell assembly being operative at temperatures maintaining said aqueous charge-transporting medium in an aqueous state.

37. A fuel cell assembly as in claim 22 wherein, in each said fuel cell, said bridge is formed integrally with one of said anode and said cathode and is isolated from direct electrical contact with the other of said anode and said cathode.

38. A fuel cell assembly according to claim 22 comprising sealant means against hydrogen leakage, said sealant means guiding extraneous hydrogen into said electrolytic membrane and sealing said cathodes around said membrane whereby routes of possible hydrogen egress from said fuel cell assembly lead through said electrolytic member and to said cathode for oxidation of egressing hydrogen to water.

* * * * *